Figure 1:
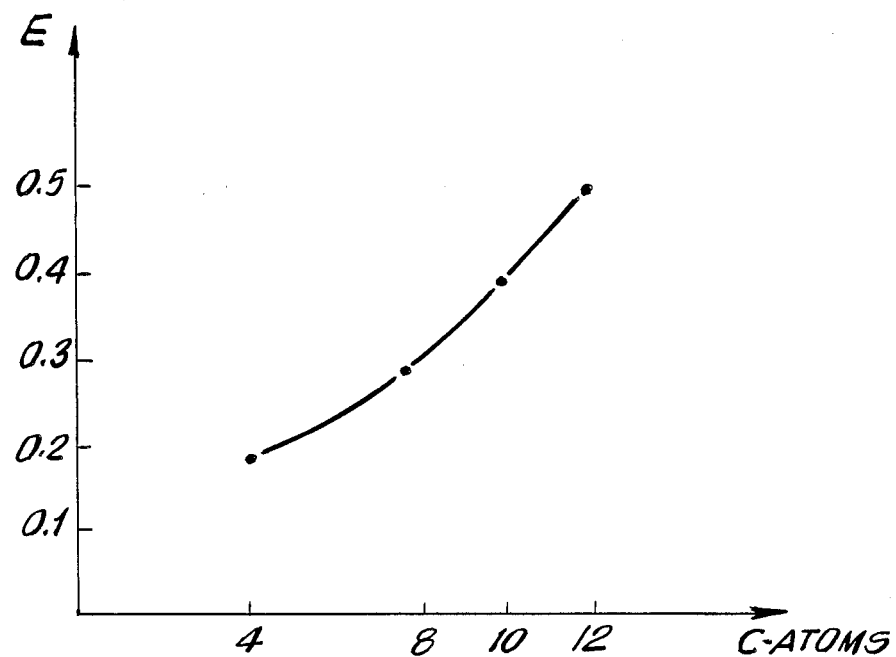

United States Patent [19]

Grüning et al.

[11] Patent Number: 4,844,980

[45] Date of Patent: Jul. 4, 1989

[54] SILICA OR SILICIC ACID PARTICLES WHOSE SURFACE LOCATED HYDROXYL GROUPS ARE AT LEAST PARTIALLY REPLACED BY ORGANIC GROUPS

[75] Inventors: Burghard Grüning; Ulrich Holtschmidt; Götz Koerner, all of Essen; Gerd Rossmy, Haltern-Lavesum, all of Fed. Rep. of Germany

[73] Assignee: Th. Goldschmidt AG, Fed. Rep. of Germany

[21] Appl. No.: 43,100

[22] Filed: Apr. 24, 1987

Related U.S. Application Data

[63] Continuation-in-part of Ser. No. 917,272, Oct. 8, 1986, abandoned, which is a continuation of Ser. No. 770,634, Aug. 28, 1985, abandoned, which is a continuation of Ser. No. 608,498, May 9, 1984, abandoned.

[30] Foreign Application Priority Data

Jun. 1, 1983 [DE] Fed. Rep. of Germany ....... 3319788

[51] Int. Cl.$^4$ .......................... B01J 13/00; B32B 9/04
[52] U.S. Cl. .................................... 428/405; 106/481; 106/482; 106/490; 252/315.2; 252/321; 252/325; 252/358; 427/220; 428/446; 428/447

[58] Field of Search ..................... 252/315.2, 321, 28; 106/482, 490, 481; 428/405

[56] References Cited

U.S. PATENT DOCUMENTS

| | | | |
|---|---|---|---|
| 3,250,727 | 5/1966 | Noll et al. | 252/358 |
| 3,408,306 | 10/1968 | Boylan | 252/321 |
| 3,810,843 | 5/1974 | Slusarczuk et al. | 252/313.2 |
| 4,042,528 | 8/1977 | Abe | 252/358 |
| 4,062,693 | 12/1977 | Berger | 106/481 |
| 4,105,465 | 8/1978 | Berger | 106/481 |
| 4,477,371 | 10/1984 | Huber et al. | 252/358 |

FOREIGN PATENT DOCUMENTS 2743691 3/1978 Fed. Rep. of Germany .

*Primary Examiner*—Richard D. Lovering
*Attorney, Agent, or Firm*—Toren, McGeady & Associates

[57] ABSTRACT

Silicic acid or silica particles having initially surface-located hydroxyl groups are modified by replacing at least partially the hydroxyl groups by an organic group to impart the particles with emulsion-breaking and foam-destroying properties. Processes for preparing the modified particles are also disclosed.

6 Claims, 1 Drawing Sheet

SILICA OR SILICIC ACID PARTICLES WHOSE SURFACE LOCATED HYDROXYL GROUPS ARE AT LEAST PARTIALLY REPLACED BY ORGANIC GROUPS

CROSS-REFERENCE TO RELATED APPLICATIONS

This is a continuation-in-part of Ser. No. 917,272 filed Oct. 8, 1986 (now abandoned) which was a continuation of Ser. No. 770,634 filed Aug. 28, 1985 (now abandoned) which, in turn, was a continuation of Ser. No. 608,498 filed May 9, 1984, now abandoned.

FIELD OF THE INVENTION

The invention generally relates to silicic acid or silica particles and is particularly directed to such particles which initially have a specific surface of at least 50 m$^2$/g and a particle size of $\geq 40$ nm wherein the hydroxyl groups located on the surface of the particles are at least partially replaced by organic groups. Considered from another aspect, the invention is directed to processes for preparing such modified particles. The invention is moreover directed to the use of such particles for the destabilization of water-in-oil emulsions and for the destruction of foams of aqueous systems.

BACKGROUND OF THE INVENTION

It has previously been proposed to treat oxidic or silicic acid particles with organosilicon compounds in order to modify the surface of such particles. By such modification, it is possible to influence the affinity of the treated particles in respect to the surrounding medium. The modification of the particles may be accomplished, either in physical manner by adsorption or chemically thereby that the modification agents react with the groups which are present on the surface of the particles, particularly the hydroxyl groups.

German Offenlegungsschrift No. 29 46 727 discloses a product which is used for the separation of water-oil-mixtures. This prior art product is prepared pursuant to a process wherein an inorganic solid material which contains hydroxyl groups on its surface is reacted in a first stage with a compound of the formula

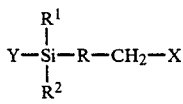

In this formula,
R is a divalent organic group with up to 20 carbon atoms,
R$^1$ and R$^2$ are halogen atoms or organic groups with up to 20 carbon atoms;
Y is a halogen atom or a group of the formula —OR$^3$, in which R$^3$ is hydrogen or alkyl, aryl or acyl with up to 20 carbon atoms; and
X is halogen atom.

The product obtained in the first stage is then reacted at elevated temperatures with an N-substituted imide of an alkenyl substituted dicarboxylic acid. The inorganic solid material used in this prior art procedure is aluminum oxide, titanium dioxide, zirconium oxide, glass, silicon dioxide, in particular silica gel as well as zeolitic molecular sieves. These solid materials, both before and after modification, are in the form of small particles of a size of 0.1 to 3.0 mm. From these treated particles, a layer in the form of a filter bed is formed through which the water-oil-mixture to be separated is passed. Upon passage through the filter layer, the mixtures are separated into their oil and water components.

German Offenlegungsschrift No. 27 43 691 discloses an aluminum hydroxide whose surface is treated with an excess amount of silane, it hydrolysate or condensate. The silane has two or three hydrolyzable groups at the silicon and an organic group with a polyoxyalkylene group. A mixture of this treated aluminum hydroxide with untreated aluminum hydroxide can be added to a plastic mass, for example, thermoplast and causes a reduction of the viscosity of the plastic mass and reduces the inflammability or burning capability of this plastic mass.

Further, German Pat. No. 27 43 682 is directed to oxidic or silicate particles which have been treated with a particular organosilane. The organosilane contains hydrolyzable groups and, within an organic group, a polyoxyalkylene chain. Such products are proposed to be used as fillers in coating masses or plastic masses, particularly in glass fiber reinforced heat hardening polyester masses.

OBJECTS OF THE INVENTION

It is a primary object of the present invention to modify silicic acid particles in such a manner so as to enable them to have a destabilizing action on emulsions, particularly water-in-oil emulsions and on foams of aqueous systems so as to cause splitting of the emulsions and a separation of the phases or a collapse of the foams.

In particular, it is an object of the invention to provide silicic acid or silica particles which are in the position to separate from crude oil emulsions, particularly freshly pumped crude oil emulsion, the water contained in the crude oil, if necessary, in cooperation with other known emulsion breaking agents.

Generally, it is an object of the invention to provide improved particles of the indicated kind and processes for their preparation.

SUMMARY OF THE INVENTION

It has now surprisingly been ascertained that the objects of the invention are successfully solved with silicic acid or silica particles whose surface-located hydroxyl groups are at least partially replaced by organic groups of the formula

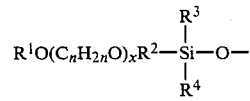

wherein
R$^1$ is alkyl with 10–22 carbon atoms,
R$^2$ is octylphenyl, nonylphenyl or dodecylphenyl,
R$^3$ and R$^4$ are the same or different and represent lower alkyl with 1–4 carbon atoms, oxygen O$_{0.5}$, hydroxy or Y, wherein Y is a hydrolyzable group, particularly —Cl, —OR$^5$ or —NR$_2^8$, wherein R$^5$ is alkyl with 1–4 carbon atoms and R$^8$ is hydrogen or alkyl with 1–4 carbon atoms,
n is 2 or 3 with the proviso that n=2 in at least 90 mole % of the group, and x=1–50.

As concerns the silicon particles, the invention preferably uses particles produced from finely particulate, particularly pyrolytically obtained silicic acid of a specific surface of at least to m²/g and a particle size of ≧40 nm. The indication of the particle size refers to the size of the particles prior to the modification, that is, to the originally present particles. The modified particles, due to possible aggregation, may deviate from the particle size of the originally present material.

The group $R^1$ is alkyl with 10 to 22 carbon atoms derived from a fatty alcohol. $R^1$, however, may also stand for branched such alkyl, such as, for example, obtainable by means of the oxosynthesis. The group $C_nH_{2n}O$ is an oxyalkylene group, whose oxyalkylene residue is preferably oxyethylene. However, up to 10 mole % of the oxyalkylene groups may be constituted by oxypropylene residues. The chain length of this oxyethylene group, expressed by the index x, amounts to 1-50, preferably 2-30.

The groups $R^3$ and $R^4$ are either the same or different. They are represented by lower alkyl of 1-4 carbon atoms, preferably a methyl residue. $R^3$ and $R^4$ may, however, be represented by a hydrolyzable group, particularly by a chlorine atom, alkoxy with 1-4 carbon atoms, such as, for example, methoxy-, ethoxy-, propoxy-, butoxy- or isobutoxy. Further, they may stand for $-NR_2^8$, wherein $R^8$ within the group is the same or different and represents hydrogen atom or alkyl with 1-4 carbon atoms. Moreover, $R^3$ and $R^4$ may be represented by oxygen residue $O_{0.5}$ or a hydroxyl group.

It follows that the modifying groups for the particles consist of hydrophilic and hydrophobic moieties. The interface active properties caused thereby, must be considered as an essential characteristic of these groups. Although they become insolublle by their grafting onto the substrate and, thus, lose an essential property of surface active compounds, due to their chemical linkage to a solid carrier, they impart to the latter surprising and special characteristics and effects at phase interfaces.

The linking of the modifying organic groups with the substrate is accomplished through a C-Si-O-bridge. The polyoxyalkylene chain is connected through a carbon bridge with the silicon atom of the organic group. In this manner, it is achieved that the organic groups are bound to the inorganic carrier in a hydrolytically stable manner.

Silicon dioxide is thus the preferred carrier. Generally, the particles should not be larger than 3 mm in diameter. This is of particular importance if the specific surface of the particles is in direct relation with their size.

As stated, the invention is also concerned with a process for producing the modified silicic particles. For this purpose and in accordance with the invention, two process embodiments should be distinguished. The first process embodiment of the invention is characterized in that the particles are reacted with 5 to 50 percent by weight of a compound of the general formula.

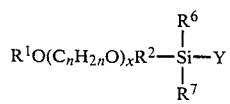

wherein $R^1$, $R^2$, Y, n and x have the above-indicated meaning and wherein $R^6$ and $R^7$ are lower alkyl with 1-4 carbon atoms or Y groups. The reaction may be carried out in the presence of an inert liquid medium and, if desired, at temperatures up to 150° C.

Ligroine, toluene, benzene or other hydrocarbons may be used as the inert liquid medium. The reaction of the modifying agent with the hydroxyl groups of the inorganic carriers takes place already at relatively low temperatures as, for example, 40° C. However, by raising the temperature up to about 150° C., the reaction time can be shortened.

According to the second process embodiment, the silicic particles are reacted with 2-25 percent by weight of a compound of the general formula:

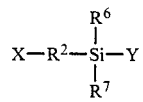

wherein X is chlorine or bromine. The reaction may be carried out in the presence of an inert liquid medium and also at temperatures up to 150° C. The reaction product thus obtained is then reacted with equimolar amounts of a compound of the general formula

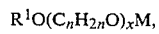

wherein M is sodium or potassium. This reaction is carried out in an inert liquid medium, if desired, at elevated temperature.

The same solvents as described in connection with the first process embodiment may be used. The alkali metal halide obtained in the reaction is advantageously removed by extraction with water.

The inorganic particles modified in accordance with the invention exhibit the desired emulsion-breaking and foam-destroying characteristics. Particles which, because of their size are not suitable for the formation of a sufficiently stable dispersion, may, advantageously be used in the form of a filter bed in which these particles may be present, if desired, in admixture with other, non-modified material such as sand. So that the particles, modified pursuant to the invention, can fully exhibit their activity, it is necessary to pass the emulsion to be treated through the filter bed. In doing so, it has been shown to be particularly advantageous to add to the emulsion an organic emulsion-breaking agent known per se. Particles which cannot be distributed to form a sufficiently stable dispersion are less suitable for foam-destroying purposes.

It is an advantage to use for the modification a carrier material in the form of a fine grained silicic acid whose particle size is not greater than 10 μm. Experiments have indicated that particularly advantageous results are obtained with a pyrogenic silicic acid whose primary particle size is ≧40 nm and whose specific surface is at least 50 m²/g. Of particular interest, are pyrogenically produced silicic acids whose primary particle size is ≧14 nm and whose specific surface is ≦150 m²/g. Such finely particulate silicic acids of the primary particle size of ≧14 nm, modified in accordance with the invention, are particularly suitable for separating the water from freshly pumped water containing crude oil. It is an advantage to add the silicic acids, modified in accordance with the invention, to other known organic emulsion-breaking agents since the action of the latter is substantially increased by such admixture.

It has been shown that the effect of the silicic acid modified pursuant to the invention, increases corresponding to the extent of its distribution which, to a substantial degree, is determined by the primary size of the particles of the silicic acid. It is particularly preferred to add the silicic acid modified in accordance with the invention to the emulsion to be treated in the form of a suspension in an inert solvent as, for example, toluene. Very good results are obtained if, in the preparation of the master suspension, the fine distribution of the silicic acid particles is increased by a high speed stirrer or by applying ultrasound. For the purpose of emulsion-breaking of crude oil, it is generally sufficient to use 1–10 ppm of the modified fine silicic acid.

However, the silicic acid of small particle size and modified pursuant to the invention is moreover eminently suitable to get rid of foams which are formed from aqueous systems as, for example, foams of surface active solutions, foams of textile treating liquids or fermentation media. In doing so, it is advantageous to distribute the modified silicic acid in liquid carriers as, for example, silicone oils and to add these suspensions to the foam system. Generally, also for this application, 1-ppm of modified silicic acid is sufficient to obtain the desired result. Contrary to many other defoaming agents of the prior art, the modified silicic acid used for the defoaming does not have any negative influence on the further processing or use of the defoamed products.

The following examples deal with the preparation of the silicic acid modified pursuant to the invention as well as the inventive use or application for breaking emulsions and destroying foams, it being understood that these examples are given by way of illustration and not by way of limitation and that many changes may be accomplished without departing in any way from the scope and spirit of the invention as claimed.

Preparation of Silicic Acid Modified Pursuant to the Invention

EXAMPLE 1

50 g of a pyrogenic silicic acid of fine particle size having a specific surface of 200 m$^2$/g are heated in 700 ml of benzine (boiling range 35°–40° C.) together with 17 g of an alkoxypolyoxyalkylenetrialkoxysilane of the average formula $$n-C_{16}H_{33}O[CH_2CH_2O]_{20}-(CH_2)_3-Si(OCH_3)_3.$$

The heating is effected under vigorous stirring for 20 hours under reflux. After the cooling, the product is filtered. The residue is extracted in soxhlet for 24 hours with toluene. The product is dried at 15 mmHg and 60° C. Elementary analysis indicates a carbon content of 12.8%C.

EXAMPLE 2

50 g of pyrogenic silicic acid of fine particle size and having a specific surface of 200 m$^2$/g are heated in 600 ml of ligroine (boiling range 90°–100° C.) together with 10 g of an alkylaryloxypolyoxyalkylenetrialkoxysilane of the average formula

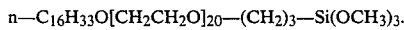

n-C$_9$H$_{19}$—⟨⟩—O—[CH$_2$CH$_2$O]$_{15}$—(CH$_2$)$_3$—Si(OCH$_3$)$_3$.

The heating is effected under vigorous stirring for 10 hours under reflux. The product is filtered after cooling. The residue is extracted in a soxhlet for 24 hours with toluene. The product is dried at 15 mmHg and 60° C. Elementary analysis indicates a carbon content of 8.3%C.

EXAMPLE 3

50 g of a pyrogenic silicic acid of fine particle size having a specific surface of 200 m$^2$/g are heated in 600 ml ligroine (boiling range 90°–100° C.) together with 17 g of an alkoxypolyoxyalkylene trialkoxysilane of the average formula

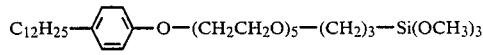

C$_{12}$H$_{25}$—⟨⟩—O—(CH$_2$CH$_2$O)$_5$—(CH$_2$)$_3$—Si(OCH$_3$)$_3$

The heating is effected under vigorous stirring for 20 hours under reflux. After the cooling, the product is filtered. The residue is extracted in soxhlet for 24 hours with toluene. The product is dried at 15 mm Hg and 60° C. Elementary analysis indicates a carbon content of 8,8%C.

EXAMPLE 4

50 g of pyrogenic silicic acid of fine particles size with a specific surface of 200 m$^2$/g are heated in 600 ml ligroine (boiling range 90°–100° C.) together with 12.5 g of the silane of the average formula

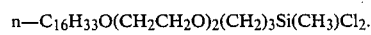

n—C$_{16}$H$_{33}$O(CH$_2$CH$_2$O)$_2$(CH$_2$)$_3$Si(CH$_3$)Cl$_2$.

The heating is effected under vigorous stirring for 48 hours under reflux. The product is filtered after cooling. The residue is extracted in a soxhlet for 24 hours with toluene. The product is dried at 15 mmHg and 60° C. Elementary analysis shows a carbon content of 7.6%C.

EXAMPLE 5

50 g of pyrogenic silicic acid of fine particle size having a specific surface of 50 m$^2$/g are heated together with 4.5 g of γ-chloropropyltriethoxysilane in 800 ml benzine (boiling range 35°–40° C.). The heating is effected under agitation for 20 hours under reflux. After cooling, the product is filtered. The residue is extracted in a soxhlet for 24 hours with toluene. A portion of the product is dried for analytical purposes at 15 mmHg and at 60° C. Elementary analysis showed 1.5%C. and 1.0%Cl.

40 g of the fine silicic acid modified with chloropropyltriethoxysilane are heated with 3.99 g of the sodium salt of an ethoxylated fatty alcohol of the average formula

n—C$_{16}$H$_{33}$O(CH$_2$CH$_2$O)$_2$H in 600 ml of dry toluene for 16 hours and under strong agitation under reflux. The product is filtered and dried at 15 mmHg and at 60° C. Subsequently, the product is extracted in a soxhlet first with water and subsequently with methanol and again dried. Elementary analysis indicates 6.2%C and >0.1% Cl.

EXAMPLE 6

50 g of a pyrogenic silicic acid of fine particle size having a specific surface of 200 m$^2$/g are heated in 600 ml ligroine (boiling range 90°–100° C.) together with 17 g of an alkoxypolyoxyalkylene trialkoxysilane of the average formula

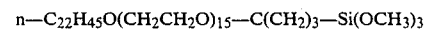

n—C$_{22}$H$_{45}$O(CH$_2$CH$_2$O)$_{15}$—C(CH$_2$)$_3$—Si(OCH$_3$)$_3$

The heating is effected under vigorous stirring for 20 hours under reflux. After the cooling, the product is filtered. The residue is extracted in soxhlet for 24 hours with toluene. The product is dried at 15 mm Hg and 60° C. Elementary analysis indicates a carbon content of 10,9%C.

Application Testing of Modified Silicic Acid Pursuant to the Invention

EXAMPLE 7

Splitting of an emulsion of the type water-in-crude oil

A polyoxyalkylenepolysiloxaneblockcopolymer of the following structure is used as the organosilicon emulsion-breaking agent

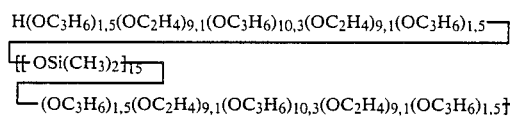

This splitting agent is disclosed in German Pat. No. 19 37 130.

The organosilicon splitting agent is admixed with 5% of the modified silicic acid of Example 1 is diluted with toluene to form a 1% solution calculated on the total amount of active substance. Prior to use, the solid material in the solution is finely dispersed with ultrasound. Further, the organosilicon splitting agent is admixed with 5% of a non-modified pyrogenic silicic acid with specific surface of 200 m$^2$/g as used in Example 1. Three splitting preparations are thus formed which are tested for comparison purposes.

| A: Organosilicon splitting agent | (1% toluene) |
|---|---|
| B: Organosilicon splitting agent | (0.95%) + modified silicic acid pursuant to Example 1 (0.05% in toluene) |
| C: Organosilicon splitting agent | (0.95%) + non-modified silicic acid (0.05%) in toluene) |

The water containing crude oils emanated from North German wells. They contain 32% (crude oil I) and 48% (crude oil II) of water.

The emulsion breaking preparations were added to the crude oil emulsions in the form of their toluene containing solutions or suspensions, respectively. By vigorous shaking, the preparations were distributed through the systems. The concentration of the active material amounted to 30 ppm of which the portion of the silicic acid, modified pursuant to the invention, amounted to 1.5 ppm. The crude oil samples to which the emulsion-breaking or splitting preparations had been added were heated in a water bath to 50° C. The water separation was observed and the following results were obtained.

| Emulsion Breaking Agent | Preparation | Separated Water in ml in ( ): % of total amount of water in test sample | | |
|---|---|---|---|---|
| | | after 10 mins. | 30 mins. | 180 mins. |
| Crude Oil I | A | 0 | 0 | 4 (13%) |
| | B | 2 (6%) | 14 (44%) | 28 (88%) |
| | C | 0 | 3 (9%) | 11 (34%) |
| Crude Oil II | A | 0 | 20 (42%) | 31 (65%) |
| | B | 0 | 32 (67%) | 44 (92%) |
| | C | 4 (8%) | 30 (63%) | 32 (67%) |

Preparation A: pursuant to the invention
Preparations A, C: not pursuant to the invention

EXAMPLE 8

Defoaming of a tenside (surface active) solution:

(a) For the purpose of preparing the defoaming preparations, both a hydrophobic silicic acid commonly used pursuant to the prior art in defoaming preparations and also a silicic acid pursuant to the invention were finely dispersed in methyl silicone oil by means of a high speed stirrer. The methyl silicone oil had a viscosity of 980 mm$^2$.sec$^{-1}$.

The hydrophobic silicic acid used for comparison purposes was a pyrogenic type silicic acid having a specific surface of 120 m$^2$/g and an average primary particle size of 16 nm. The preparation and characteristics of the inventive modified silicic acid is described in Example 3.

Defoaming Preparation A:
15% of hydrophobic silicic acid pursuant to the prior art in silicone oil Defoaming Preparation B:
30% of hydrophobic silicic acid pursuant to the prior art in silicone oil.

Defoaming Preparation C:
15% of silicic acid pursuant to the invention in silicone oil Defoaming Preparation D:
30% of inventive silicic acid in silicone oil.

In order to test their activity, the defoaming preparations were diluted with toluene to form 1% solutions.

(b) A 2-1 measuring cylinder is fitted with a gas inlet pipe which terminates at the bottom with a glass frit. 1 l of 0.1% aqueous solution of a tenside mixture consisting of 3 parts of a fatty alcohol mixture reacted with 10 mol of ethylene oxide and 1 part of dodecylbenzenesulfonoacidic sodium is poured into this measuring cylinder. One liter of foam is produced by passing a uniform airstream of 6 l/min. The solution of the defoaming agent is dosed such that the foam just collapses. The amount of defoaming agent required for this purpose is shown in the following table in the second column. In the following 60 minutes, again, a uniform air flow of 6 l/min. is passed through the tenside solution. If, during this period, again a foam volume of 1 l has built up, then again, defoaming agent is added so that again the foam collapses. The test was terminated after 60 minutes. The total amount of defoaming preparation required is indicated in the third column of the table.

TABLE

| Defoaming Preparation | Initial Dose* ppm | Total Dose* ppm |
|---|---|---|
| A prior art | 30 | 50 |
| B prior art | 30 | 90 |
| C pursuant to invention | 10 | 30 |
| D pursuant to invention | 10 | 30 |

*Calculated on silicone oil + silicic acid

EXAMPLE 9

Defoaming of a tenside (surface active) solution:

(a) For the purpose of preparing the defoaming preparations, the silicic acids pursuant to the invention were finely dispersed in methyl silicone oil by means of a high speed stirrer. The methyl silicone oil had a viscosity of 102 mm$^2$.sec$^{-1}$. The preparations of the modified silicic acids are described in Example 3 and Example 6.

Defoaming Preparation E:

10% of silicic acid described in Example 3 in silicone oil

Defoaming Preparation F:

10% of silicic acid described in Example 6 in silicone oil.

The defoaming preparations were diluted with toluene to form 1% solutions.

(b) Like in Example 8 a 2-1 measuring cylinder is fitted with a gas inlet pipe which terminates at the bottom with a glass frit. 1 l of a 0,01% aqueous solution of a tenside mixture equal to that described in Example 8 is poured into this measuring cylinder. One liter of foam is produced by passing a uniform airstream of 6 l/min. The solution of the defoaming agent is dosed such that the foam just collapses. In the following 60 minutes the uniform air flow of 6 l/min. passing through the tenside solution is maintained. If during this period, again a foam volume of 1 l has built up, then again, defoaming agent is added so that again the foam collapses. The test was terminated after 60 minutes. The total amount of defoaming preparation required is indicated in the table.

TABLE

| Defoaming Preparation | Total Dose* ppm |
|---|---|
| E persuant to inventlon | 10 |
| F persuant to inventlon | 40 |

*Calculated on silicone oIl + silicic acid

EXAMPLE 10

Comparison tests were carried out with a view to ascertaining whether or not the properties of the silicate particles, modified with certain silanes, are influenced by the chain length of the alkyl group $R^1$. It was the primary purpose of the tests to determine the influence of the chain lengths of the $R^1$ substituent upon the properties of the organo-silicon groups bound to the silicate particles.

It was found that modified particles, wherein the $R^1$ group has 10–22 carbon atoms, exhibit significantly superior properties than those in which the $R^1$ group has a shorter chain. The improved properties were demonstrated by the ability of the particles to destabilize water/oil emulsions and to destroy foams of aqueous systems. The tested particles having $R^1$ groups with eight carbon atoms or less were those as disclosed in U.S. Pat. No. 4,062,693 to Berger, whereas the tested particles having $R^1$ groups with 10 carbon atoms or more were those disclosed in this application.

1. Preparation of the Modified Particles 40 g of a fine-grained pyrogenic silicic acid having a specific surface of 200 m$^2$/g were heated in 700 ml benzine (boiling range 90° to 100° C.) together with 10.1 g respectively of an alkylpolyoxyalkylene trialkoxysilane of the following average formula:

1. n-C$_4$H$_9$O(CH$_2$CH$_2$O)$_{7.5}$(CH$_2$)$_3$Si(OCH$_3$)$_3$
2. n-C$_8$H$_{17}$O(CH$_2$CH$_2$O)$_{7.5}$(CH$_2$)$_3$Si(OCH$_3$)$_3$
3. n-C$_{10}$H$_{21}$O(CH$_2$CH$_2$O)$_{7.5}$(CH$_2$)$_3$Si(OCH$_3$)$_3$
4. n-C$_{12}$H$_{25}$O(CH$_2$CH$_2$O)$_{7.5}$(CH$_2$)$_3$Si(OCH$_3$)$_3$

The heating was performed under reflux and with vigorous stirring for 20 hours. The residue was extracted for 24 hours with toluene in a Soxhlet apparatus. The product was dried at 50 mbar and 60° C.

Elementary analysis showed the following result:

1. Product 1: 6.3% C
2. Product 2: 8.0% C
3. Product 3: 8.9% C
4. Product 4: 9.0% C It follows that products 1 and 2 correspond to U.S. Pat. No. 4,062,693, whereas products 3 and 4 are according to the disclosure of the Application.

2. Destabilizing of a Water/Oil Emulsion

In these experiments, the modified silicic acids were added to known crude oil destabilizers. These preparations are used to destabilize a crude oil emulsion of the water-in-crude oil type. A polyoxyalkylene-polysiloxane block polymerizate in accordance with the state of the art was used as the organosilicon emulsion-splitting agent, having the following average structure:

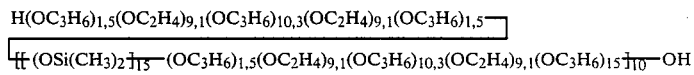

This crude oil splitting agent is disclosed in German Patent No. 19 37 130.

To prepare four different dispersions, the above-mentioned splitting agent was admixed with 5 weight % of products 1–4, respectively, and diluted with toluene to achieve a 5% solution (calculated on the sum of splitting agent + product 1 or 2 or 3 or 4). The preparation was treated with ultrasound in order to finely disperse the modified solids. The dispersing experiments were carried out with five preparations:

Preparation A: de-emulsifier (5 weight% in toluene)
Preparation B: de-emulsifier (4.75 wt.% in toluene) + product 1 (0.25 wt% in toluene)
Preparation C: de-emulsifier (4.75 wt.% in toluene) + product 2 (0.25 wt% in toluene)
Preparation D: de-emulsifier (4.75 wt.% in toluene) + product 3 (0.25 wt% in toluene)
Preparation E: de-emulsifier (4.75 wt.% in toluene) + product 4 (0.25 wt% in toluene)

The crude oil emulsion used came from a crude oil well in Northern Germany. The crude oil emulsion contained 40% water.

The dispersions A-E were added to the crude oil emulsions and were distributed by vigorous shaking. The total concentration of effective substance was 20 ppm, while the portion of the products 1–4 was, in each case, 1 ppm. The mixture of crude oil samples and preparations were heated in a water bath to 50° C. The separation of water was observed, and the following results achieved:

| Splitting Agent | Water separation in ml after | | | | |
|---|---|---|---|---|---|
| Preparation | 15 min. | 20 min. | 30 min. | 180 min. | Δ |
| A | 1 | 10 | 11 | 15 | — |
| B | 15 | 18 | 18 | 18 | 3 |
| C | 10 | 18 | 18 | 18 | 3 |
| D | 12 | 18 | 19 | 21 | 6 |
| E | 15 | 22 | 26 | 28 | 13 |

The last column shows the difference between the amount of water separated after 180 minutes and the amount of water measured if the splitting agent was used without the addition of the modified silicic acid (Preparation A). These data clearly show that the chain length of the R¹ group is of essential significance. The first significant improvement of the effectiveness is found according to these experiments at the transition of $R^1=C_8H_{17}$ to $R^1=C_{10}H_{21}$.

3. Defoaming of a Tenside (Surface-Active) Solution

For the purpose of preparing the defoaming preparation, Products 1-4 were finely dispersed in a silicone oil of viscosity 105 mPas by means of a high speed stirrer. Four preparations were obtained, each of which contained, respectively, 10 weight % of modified silicic acid (Product 1-4) and 90 weight % silicone oil:

Defoaming Preparation A: 10 wt.% product 1 in silicone oil
Defoaming Preparation B: 10 wt.% product 2 in silicone oil
Defoaming Preparation C: 10 wt.% product 3 in silicone oil
Defoaming Preparation D: 10wt.% product 4 in silicone oil In order to test their defoaming activity, the defoaming preparations were diluted with toluene to form 10% by weight toluene solutions.

The defoaming experiments were carried out as follows:

A 2 liter measuring cylinder was fitted with a gas inlet pipe which terminates at the bottom with a glass frit. 1 liter of 0.01% aqueous solution of a tenside mixture consisting of 3 parts by weight of an addition product of $C_{12}$-fatty alcohol and 10 mole of ethylene oxide, as well as 1 part by weight of sodium dodecylbenzene sulfonate was poured into the measuring cylinder. Through the gas inlet pipe air was uniformly passed from below into the solution. The air stream was 6 l/min. and the solution developed foam. When the foam reached 1 liter volume, 0.5 ml of the 10 weight % defoaming preparation was added to the foam. Air was again passed into the solution until again 1 liter of foam was formed. Again, 0.5 ml of the 10 weight % defoaming solution was added. Foam production and defoaming were repeated for 40 minutes. The more effective the defoaming was, the less the amount of defoamer that had to be added during the 40 minutes testing period.

| Defoaming Preparation | Total Dose (Concentration, ppm) | E |
|---|---|---|
| A | 550 | 0.18 |
| B | 350 | 0.29 |
| C | 250 | 0.4 |
| D | 200 | 0.5 |

The data show that the defoaming preparations C and D are more effective than defoaming preparations A and B. That is to say, the modified particles according to the invention have clearly better properties than those of the prior art. This is shown by FIG. 1 in which the defoaming effect E expressed by the quotient 100/conc. (ppm), is correlated to the number of carbon atoms of the substituent $R^1$.

The graph of FIG. 1 shows that the alkyl chain length is of determining significance for the efficacy of the modified silicic acid. It should be pointed out that in this experiment, only products containing at the most 12 carbon atoms in the $R^1$ group were used. However, with products of even longer chain length, further increments of efficacy are obtainable—which is shown in Example 8 of the Application. In addition, it is pointed out that the graph shows that the increase in efficacy is not a linear one, but is more than proportional above the $C_8$ mark.

What is claimed is:

1. A composition of matter comprising:
   (a) silicic acid particles, and
   (b) an organic group of the formula:

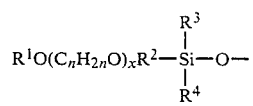

wherein
$R^1$ is alkyl with 10-22 carbon atoms;
$R^2$ is octylphenyl, nonylphenyl or dodecylphenyl;
$R^3$ and $R^4$ are the same or different and selected from the group consisting of:
   lower alkyl with 1-4 carbon atoms, oxygen $O_{0.5}$, hydroxy and Y, wherein Y is a hydrolyzable group;
n is 2 or 3 with the proviso that n=2 in at least 90 mole % of the group, and
x=1-50,
said organic group (b) being linked to (a) through a C—Si—O bridge of the group.

2. The composition of matter of claim 1, wherein the particles (a), prior to said linking with the group (b), have a specific surface of at least 50 m²/g and a particle size of ≦40 nm.

3. The composition of claim 1, wherein said group (b) replaces at least partly the hydroxyl groups which are present at the surface of the particles.

4. The composition of claim 1, wherein the particles are silicon dioxide,

5. The composition of claim 1, wherein Y is selected from the group consisting of —Cl, —OR⁵ and —NR⁸, wherein
$R^5$ is alkyl with 1-4 carbon atoms and $R^8$ is hydrogen or alkyl with 1-4 carbon atoms.

6. A composition of matter comprising:
   (a) silica particles having initially a specific surface of at least 50 m²/g and a particle size of ≦40 nm, and
   (b) an organic group of the formula:

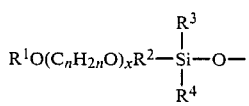

wherein
$R^1$ is alkyl with 10-22 carbon atoms;
$R^2$ is octylphenyl, nonylphenyl or dodecylphenyl;

$R^3$ and $R^4$ are the same or different and selected from the group consisting of:

lower alkyl with 1-4 carbon atoms, oxygen $O_{0.5}$, hydroxy and Y, wherein

Y is selected from the group consisting of: —Cl, —$OR^5$ and —$NR^8$, wherein $R^5$ is alkyl with 1-4 carbon atoms, and $R^8$ is hydrogen or alkyl with 1-4 carbon atoms;

n is 2 or 3 with the proviso that n=2 in at least 90 mole % of the group, and x=1-50, said organic group (b) being linked to (a) through a C-Si-O-bridge of the group.

* * * * *

UNITED STATES PATENT AND TRADEMARK OFFICE
CERTIFICATE OF CORRECTION

PATENT NO. : 4,844,980
DATED : July 4, 1989
INVENTOR(S) : Burghard Gruning, et al It is certified that error appears in the above-indentified patent and that said Letters Patent is hereby corrected as shown below:

Column 2, line 57, cancel "$R^2$ is";

between lines 57 and 58 of Column 2, insert --$R^2$ is a divalent hydrocarbon group with 2 - 5 carbon atoms,--.

Column 12, Claim 1, line 29, cancel "$R^2$ is", between lines 29 and 30 of the Column, insert --$R^2$ is a divalent hydrocarbon group with 2 - 5 carbon atoms,--.

Claim 6, last line of Column 12, cancel "$R^2$ is";

insert at the bottom of the line --$R^2$ is a divalent hydrocarbon group with 2 - 5 carbon atoms;--.

Signed and Sealed this

Twentieth Day of July, 1993

Attest:

MICHAEL K. KIRK

*Attesting Officer*     *Acting Commissioner of Patents and Trademarks*